Jan. 13, 1931.  B. O. OPITZ  1,789,051
AUTOMATIC MEASURING AND FILLING DEVICE
Filed April 15, 1926   2 Sheets-Sheet 1
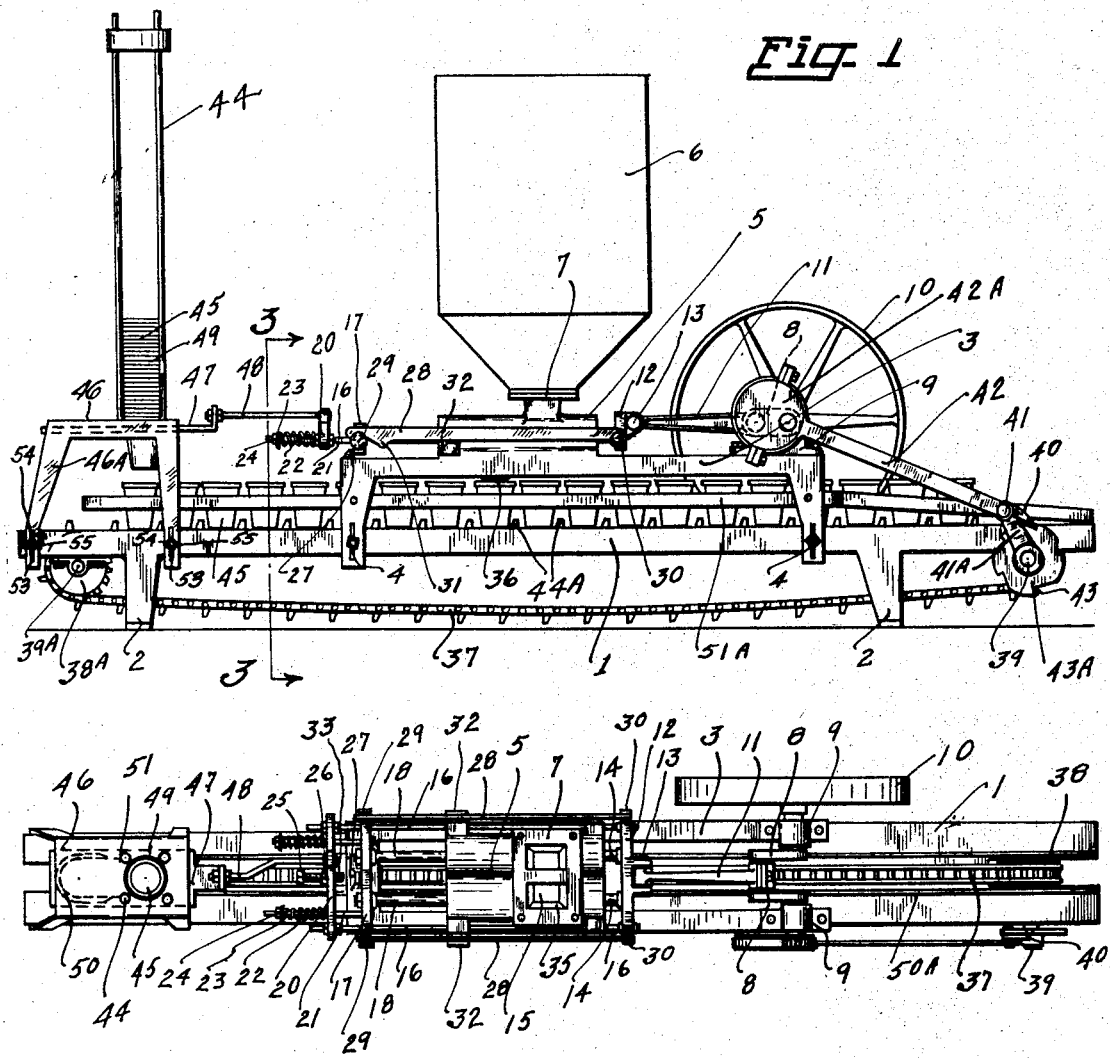
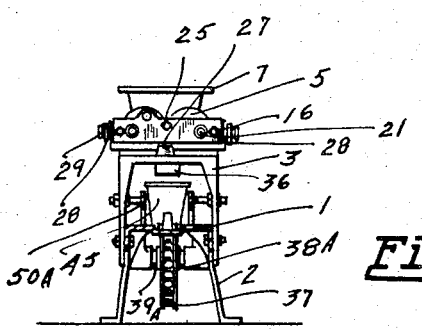
Inventor
Bernhard O. Opitz
Attorney Jan. 13, 1931. B. O. OPITZ 1,789,051
AUTOMATIC MEASURING AND FILLING DEVICE
Filed April 15, 1926  2 Sheets-Sheet 2
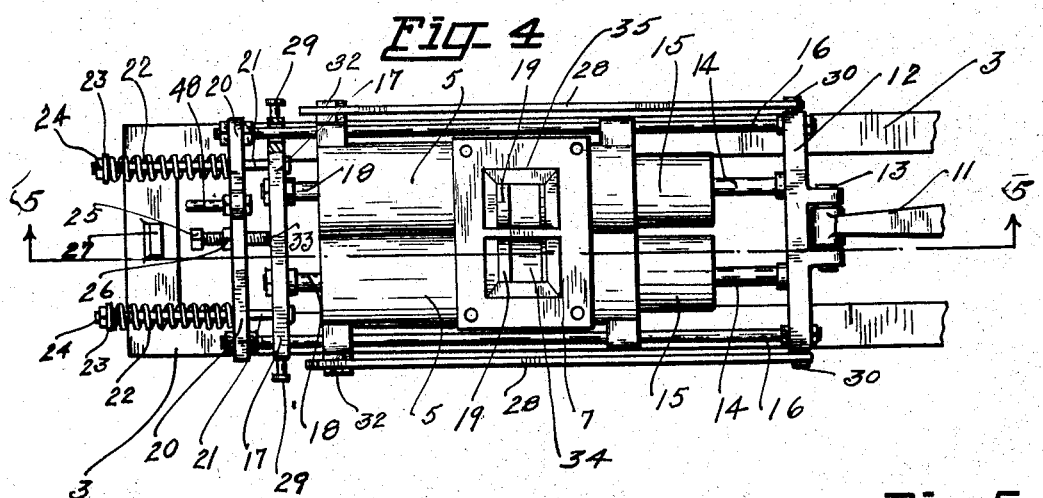
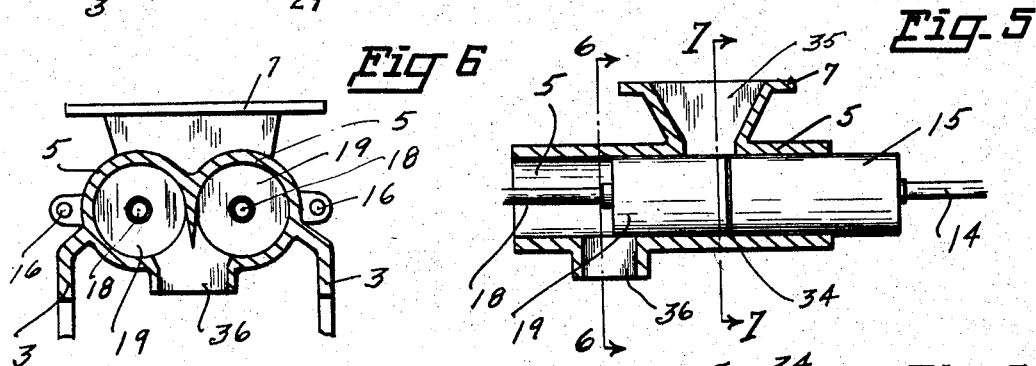
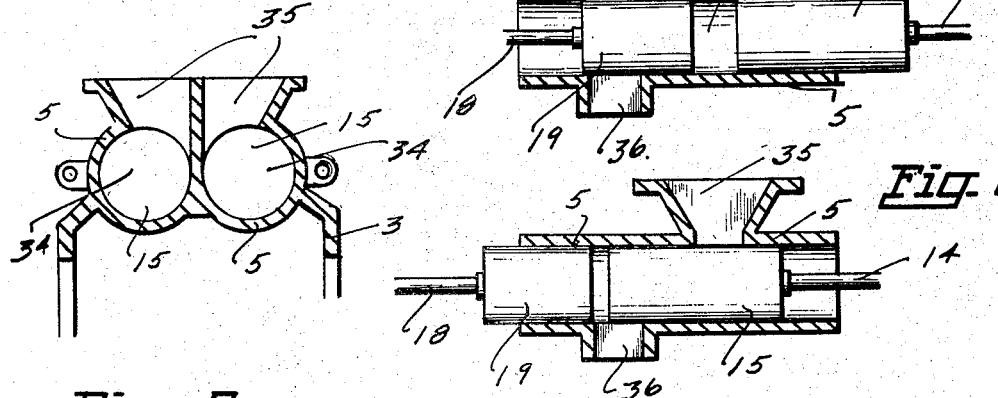
Inventor
Bernhard O. Opitz
Attorney Patented Jan. 13, 1931

1,789,051

UNITED STATES PATENT OFFICE

BERNHARD O. OPITZ, OF PORTLAND, OREGON, ASSIGNOR TO INDIVIDUAL DRINKING CUP COMPANY, INC., A CORPORATION OF PENNSYLVANIA

AUTOMATIC MEASURING AND FILLING DEVICE

Application filed April 15, 1926. Serial No. 102,173.

The principal object of my present invention resides in the provision of automatic means wherein and whereby more than one substance may be automatically and simultaneously measured and placed in a receptacle.

A further object of my invention consists in providing superposed hoppers above measuring cylinders, each cylinder having opposed pistons therein, and automatic means for reciprocating the pistons within the cylinders to automatically measure fluids or semi-fluids therein and to automatically dispense the measured materials therefrom.

Still further objects of my invention consist in providing a receptacle holder, means for dispensing the receptacles one at a time from the bottom of the holder, depositing the same upon a conveyer and moving the conveyer in timed relationship with the measuring and dispensing device in a manner to deposit the substance being measured and dispensed within the receptacles and the final deposit of the filled receptacles from the conveyer.

Still other objects of my invention consist in reciprocating the measuring and dispensing pistons within the cylinders in timed relation and at the same speed for a part of the stroke of the operating mechanism and at relatively different speeds for the remainder of each stroke.

Still further objects of my invention consist in dispensing materials of different density and fluidity within the same receptacle and deposit within each receptacle a predetermined amount of each material within the same receptacle simultaneously.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a side view of the assembled device.

Fig. 2 is a top plan view of the mechanism illustrated in Fig. 1.

Fig. 3 is a sectional end view, taken on line 3—3 of Fig. 1, looking in the direction indicated.

Fig. 4 is a plan view of that part of the device consisting of the actuating crank and cross head and of the measuring and dispensing cylinders and pistons.

Fig. 5 is a fragmentary, longitudinal, partial sectional view, taken on line 5—5 of Fig. 4, looking in the direction indicated by the arrows.

Fig. 6 is a cross section view, taken on line 6—6 of Fig. 5, looking in the direction indicated.

Fig. 7 is a sectional view, taken on line 7—7 of Fig. 5, looking in the direction indicated.

Fig. 8 is a similar cross section to that illustrated in Fig. 5, excepting the measuring and dispensing pistons are in position for the receipt of the materials to be measured and dispensed therebetween within the cylinder; and Fig. 9 is a cross section similar to that illustrated in Fig. 5, and Fig. 8, excepting the dispensing piston is in position for the final ejection of the material to be dispensed from the cylinders.

Like reference characters refer to like parts throughout the several views.

1 is the main frame of the device supported by the legs 2 and superposed centrally of the main frame is a secondary frame member 3, secured to the main frame by suitable fastenings, such as locking bolts 4. A series of cylinders 5, here shown as two in number, are disposed upon the secondary frame and a hopper 6 is placed thereupon; the said hopper being formed into two or more compartments, one each for the holding of a different material to be placed in each compartment. The hopper 6 is secured to the cylinders, as illustrated in Fig. 1 by flanged connections 7 secured together by any suitable fastening means. A shaft 8 is supported on the main frame by the bearings 9, and a belt fly wheel 10 is secured on one end of the crank shaft 8, and is driven by any suitable prime mover. A connecting rod 11, is connected centrally of the crank shaft and is adapted to having a reciprocating movement imparted thereto as the crank is rotated. The forward end of the connecting rod 11, is secured to a cross head 12, by a wrist pin 13. Piston rods 14, are disposed on the forward end of the cross head 12, and are adapted to be reciprocated thereby. Pistons 15 are connected to the piston rods by suitable means and also secured to the cross head 12 are side links 16, which extend forward from the cross head 12 and pass through a second cross head 17 and are in slidable relation therewith. Piston rods 18, are disposed within the cross head 17, and are in fixed relationship therewith. Piston rods 18, are connected to pistons 19, which are also adapted to be reciprocated within the cylinders 5. The links 16, are rigidly secured to and are in threaded relationship with the cross bar 20. Rods 21 are secured to the cross head 17 and pass freely through cross bar 20, and have their outer end threaded, and upon which are placed the washers 23, which are mounted thereon by the nuts 24, threaded to the rods 21. Nuts 24 are adapted to maintain operating pressure upon the compression springs 22 which are positioned on the rods 21 and bear upon the washers 23 and the cross bar 20.

An adjustable screw 25 is carried by the cross bar 20 and is adapted for engagement by the cross head 17 for a purpose which will be presently described. The screw is held in its adjusted positions by the lock nut 26. Extending upwardly from the auxiliary frame 3, at one end, is a lug or projection 27 of a height to engage the face of the cross head 17, as shown more particularly in Figs. 1 and 3 of the drawings, and latch bars 28 are pivotally connected at 30 to the ends of the cross head 12 and each has a hooked end to engage a pin 29 extending from an end of the cross head 17. Each of the latch bars has a projection 31 from the lower edge thereof to engage a beveled member 32 in the path of movement thereof, said members 32 releasing the hooked ends of the bars from the pins 29 for a purpose to be later described. With the parts of the machine in the positions shown in Figs. 1 and 2 of the drawings the ends of the pistons 15 and 19 are in close proximity and further rotation of the crank shaft 8 will move the connecting rods 11 to the right of the figures and through means of the piston rods 14 draw the pistons 15 therewith. The latch bars 28 engaging the pins 29 will simultaneously draw the cross head 17 and pistons 19 connected thereto to the right and similar movement will be given to the cross bar 20 due to the connecting rods 16 being drawn by the cross head 12. It will be understood that during this entire movement the ends of the pistons 15 and 19 are in close proximity. When the pistons 15 and 19 reach the position shown in Fig. 5 of the drawings then the projections 31, of the latch bars 28, will be engaged with the members 32 to raise the latch bars and release the same from the pins 29. The coiled springs 22 having previously been compressed, in a manner which will be later brought out, will cause a quick movement to be imparted to the rods 21 and the cross head 17 connected thereto towards the left of the position shown in the drawings, it being understood that when the latch bars are released from the pins 29 that the cross head 17 is disconnected from the cross head 12 and may have independent movement thereof. The cross head 17 will be moved by the coiled springs 22 until it engages the end 33 of the adjustable screw 25, as shown more particularly in Fig. 4 of the drawings. The movement just described of the cross head 17 to the left draws with it the pistons 19 and such movement of the pistons 19 provides a space 34 between the ends of the pistons 19 and the ends of the pistons 15 to receive the liquid or semi-liquid material from the hopper 6, the rapid movement of the pistons 19 to the left of the figures creating a suction to aid in drawing the material from the hopper. It will be understood that the material passes from the hopper through the openings 35 and with the material within the space 34 between the ends of the pistons a further movement or rotation of the shaft 8 will simultaneously move the pistons 15 and 19, in their spaced relation, towards the left of the position shown in Fig. 4. This continued movement will bring the outer face of the cross head 17 in engagement with the upwardly extending projection 27 and hold the cross head 17 against further movement. However, movement of the cross head 12, with the pistons 15, and the cross bar 20 will continue towards the left and this continued movement of the cross bar 20 compresses the springs 22 until the hooked ends of the latch bars 28 again engage the pins 29. With the parts in this final position the movement to the right will be repeated. When the pistons 19 reach the position shown more particularly in Fig. 9 of the drawings the outlet port 36 is uncovered and by a continued movement of the pistons 15 the material in the space 34 will be forced through and discharged through the opening 36 into the receptacles positioned to receive the same. It will be understood that the distance between the ends of the pistons 15 and 19 and the width of the space 34 may be adjusted by regulation of the screw 25. By adjusting the screw 25 the movement of the cross head 17 is adjusted and by regulating the movement of the cross head 17 relative to the cross bar 20 the space 34 for the material may be regulated.

Running longitudinally of the frame 1 and beneath the secondary frame 3 and the cylinders 5 is the conveyer chain 37. The conveyer chain 37 is of the endless variety and passes about sprockets 38 and 38A mounted on shafts 39 and 39A. The shafts 39 and 39A are mounted below and at opposite ends of the frame 1. The shaft 39 mounted at the rear end of the frame 1 has a ratchet wheel 43A mounted thereon, which wheel is provided with ratchet teeth 43. The crank shaft 8 has an eccentric disc or crank 42A mounted thereon. An eccentric arm 42 is connected at its one end by an eccentric strap to the eccentric disc 42A, and at its other end is pivoted by means of the pin 41 to one end of the link 41A; the other end of the link 41A being rockably mounted to the shaft 39. To the pin 41 is also rockably mounted the pawl 40, which engages with the ratchet teeth 43 of the ratchet wheel 43A. The ratchet wheel 43A, together with the shaft 39 and the sprocket wheel 38, will be moved or rotated as the case may be, by the apparatus just described; this rotation will be intermittent and in as much as the conveyer chain passes about the sprocket, which may be termed the drive sprocket, 38A being the driven sprocket; said conveyer chain and the pistons are adjusted so that the conveyer chain is stationary during the period of ejectment of material from the cylinders 5.

The conveyer chain 37 has a number of spaced links which are provided with upstanding lugs 44A formed to engage the cups to be carried by the conveyer. These lug links are arranged to position the cup containers beneath the outlet 36 when the conveyer chain is at rest. To prevent articles carried by the conveyer chain from tipping or moving sidewise, I have provided the guide rails 51A at each side of and slightly above the conveyer chain. The guide rails 51A are secured to the secondary frame 3.

In a device of this character it is desirable to provide automatic means for placing the cups or containers upon the conveyer and this is accomplished by nesting the cups, one within another, and depositing the cups one at a time from the bottom of the nest or stack to and upon the conveyer beneath; and this is accomplished by the following mechanism. I provide a supporting bracket 46, which is supported on legs 46A. The bracket 46 is adjustable relative to the frame 1, by means of the slots 53 in the legs 46A being slidable upon the threaded bolts 54, which are provided with threaded nuts 55.

Extending upwardly from the bracket 46 are a series of oppositely arranged upright bars or rods 44, which may be termed an upright guideway. The bars of the upright guideway are so positioned relative to one another that the nested cups may be stood on end between them, and the bars composing the guideway will prevent the nest from toppling or falling. The bars are so positioned upon the bracket, that the cups nest directly over the conveyer chain as it passes beneath. The bracket 46 is provided with a guideway within which operates a bifurcated member 47, which is connected to the cross bar 20 by means of the rod 48, and the same movement that is imparted to the cross bar 20 will be likewise imparted to the bifurcated member 47. The bifurcated member 47 has its edges adapted to engage between the rims 49 of the receptacles 45 and to support the nest of receptacles as the bottom one is released. The bottom cups pass through an enlarged opening in the bifurcated member 47, as illustrated in dotted position at 50 in Fig. 2, and the nest is supported by the restricted opening 51 as illustrated in Fig. 2, one receptacle being deposited upon the conveyer 37 at each cycle of operation of the devices.

As the specific form of the bifurcated member 47 forms no particular part of the present invention a further detail description or illustration thereof is not thought necessary.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. A machine of the character described for filling containers including a receptacle for the material, and means for transferring the material from the receptacle to the container; said transferring means including opposed horizontally reciprocable pistons and means for operating the same to provide a space therebetween for the reception of the material and to close said space to force the material therefrom into the container.

2. A machine of the character described for filling containers including a receptacle for the material, means for positioning the containers relative to the receptacle, and means for transferring the material from the receptacle to the container, said transferring means including opposed horizontally reciprocable pistons and means for operating the same to provide a space therebetween for the reception of the material and to close said space to force the material therefrom into the container.

3. A machine of the character described for filling containers including a receptacle for the material and means for transferring the material from the receptacle to the container, said transferring means including opposed horizontally reciprocable pistons, and means associated and adapted for moving the pistons in one direction with their ends in close proximity, for moving one of said pistons in the opposite direction to provide a space therebetween for the reception of the material, for moving the pistons in unison with the material therebetween, and for moving one of the pistons relative to the other to discharge the material from the space therebetween to the container.

4. A machine of the character described for filling containers including a receptacle for the material, and means for transferring the material from the receptacle to the container, said transferring means including opposed pistons, means for normally connecting the pistons for operation together, means for releasing the connecting means, and means associated and adapted for moving the pistons together in one direction with their ends in close proximity when connected, for moving one piston relative to the other when the connecting means is released to provide a space therebetween for receiving the material, for moving the pistons together in their spaced relation, and for moving one of the pistons relative to the other to discharge the material from the space therebetween to the container.

5. A machine of the character described for filling containers including a receptacle for the material and means for transferring the material from the receptacle to the container, said transferring means including opposed pistons, a latch for normally connecting the pistons, means for releasing the latch, and means associated and adapted for moving the pistons together in one direction with their ends in close proximity when connected, for moving one piston relative to the other when the latch is released to provide a space therebetween for receiving the material, for moving the pistons together in their spaced relation, and for moving one of the pistons relative to the other for discharging the material from the space therebetween to the container.

6. A machine of the character described for filling containers including a receptacle for the material, and means for transferring the material from the receptacle to the container, said transferring means including opposed pistons, means normally connecting said pistons for simultaneous movement thereof in one direction with their ends in close proximity, means for releasing said connecting means, spring controlled means for moving one of the pistons relative to the other when disconnected to provide a space between the ends thereof for the reception of the material, and means associated and adapted for moving the pistons together in their spaced relation, and for moving one of the pistons relative to the other to discharge the material therefrom to the container.

7. A machine of the character described for filling containers including a receptacle for the material, and means for transferring the material from the receptacle to the container, said transferring means including opposed horizontally reciprocable pistons, means associated and adapted for simultaneously moving the pistons in one direction with their ends in close proximity, for moving one of the pistons relative to the other to provide a space therebetween for the reception of the material, for moving the pistons together in their spaced relation with the material therebetween, for moving one of the pistons relative to the other to discharge the material from the space therebetween to the container, and means engageable for limiting the movement of the one piston relative to the other in the movement to provide the space therebetween.

8. A machine of the character described for filling containers including a receptacle for the material, and means for transferring the material from the receptacle to the container, said transferring means including opposed pistons, means for normally connecting the pistons for operation together, means in the path of movement of the connecting means for releasing the same, and means associated and adapted for moving the pistons together in one direction with their ends in close proximity when connected, for moving one piston relative to the other when the connecting means is released to provide a space therebetween for receiving the material, for moving the pistons together in their spaced relation with the material therebetween, and for moving one of the pistons relative to the other to discharge the material from the space therebetween to the container.

9. A machine of the character described for filling containers including a receptacle for the material, and means for transferring the material from the receptacle to the container, said transferring means including opposed pistons, a latch for normally connecting the pistons for operation together, said latch having a projection thereon, means in the path of movement of the latch for engaging the projection to release the same, and means associated and adapted for moving the pistons together in one direction with their ends in close proximity when connected, for moving one piston relative to the other when the latch is released to provide a space therebetween for receiving the material, for moving the pistons together in their spaced relation with the material therebetween, and for moving one of the pistons relative to the other to discharge the material from the space therebetween to the container.

10. A machine of the character described for filling containers including a receptacle for the material, and means for transferring the material from the receptacle to the container, said transferring means including opposed horizontally reciprocable pistons, means associated and adapted for simultaneously moving the pistons in one direction with their ends in close proximity, for moving one of the pistons relative to the other to provide a space therebetween for the reception of the material, for moving the pistons together in their spaced relation with the material therebetween, and for moving one of the pistons relative to the other to discharge the material from the space therebetween to the container, and adjustable means engageable for limiting the movement of the one piston relative to the other, and to regulate the space therebetween, in the movement to provide the space therebetween.

11. A machine of the character described for filling containers including a receptacle for the material, and means for transferring the material from the receptacle to the containers, said transferring means including opposed pistons, a cross head connected to each of the pistons, means for normally connecting the cross heads for operation in unison, means for releasing the connecting means, and means associated and adapted for operating the pistons in unison or one relative to the other.

12. A machine of the character described for filling containers including a receptacle for the material and means for transferring the material from the receptacle to the containers, said transferring means including opposed pistons, a cross head connected to each of the pistons, means for normally connecting the cross heads for operation in unison, means for releasing the connecting means, means associated and adapted for operating the pistons in unison or one relative to the other, and means for limiting the movement of one piston relative to the other.

13. A machine of the character described for filling containers including a receptacle for the material and means for transferring the material from the receptacle to the container, said transferring means including opposed pistons, a cross head connected to each of the pistons, a latch connected to one of the cross heads and adapted to be detachably connected to the other for normally connecting the cross heads to operate in unison, means for releasing the latch, and means associated and adapted for operating the pistons in unison or one relative to the other.

14. A machine of the character described for filling containers including a receptacle for the material, and means for transferring the material from the receptacle to the container, including a receiving chamber and aligned axially reciprocable pistons in said chamber having opposed end face portions, and means for operating the pistons away from one another to provide a space between the opposed face portions thereof for the reception of material and towards one another to close the space between the opposed face portions and to force the material therefrom and into the container, the chamber having lateral inlet and outlet portions to admit the material from the receptacle between the pistons and permit discharge therefrom.

BERNHARD O. OPITZ.